(12) United States Patent
Poeppelmeier et al.

(10) Patent No.: US 10,090,519 B2
(45) Date of Patent: Oct. 2, 2018

(54) MAGNESIUM ELECTROCHEMICAL CELLS

(71) Applicant: UChicago Argonne, LLC, Chicago, IL (US)

(72) Inventors: Kenneth Poeppelmeier, Evanston, IL (US); John T. Vaughey, Elmhurst, IL (US); Jared Incorvati, Evanston, IL (US); Lindsay Fuoco, Chicago, IL (US)

(73) Assignees: UCHICAGO ARGONNE, LLC, Chicago, IL (US); NORTHWESTERN UNIVERSITY, Evanston, IL (US)

( * ) Notice: Subject to any disclaimer, the term of this patent is extended or adjusted under 35 U.S.C. 154(b) by 63 days.

(21) Appl. No.: 14/690,823

(22) Filed: Apr. 20, 2015

(65) Prior Publication Data

US 2016/0308203 A1    Oct. 20, 2016

(51) Int. Cl.

| | |
|---|---|
| *H01M 4/38* | (2006.01) |
| *H01M 10/054* | (2010.01) |
| *H01M 4/58* | (2010.01) |
| *H01M 4/48* | (2010.01) |
| *C01G 39/00* | (2006.01) |
| *C01G 39/02* | (2006.01) |
| *H01M 4/13* | (2010.01) |
| *H01M 4/62* | (2006.01) |
| *H01M 10/0569* | (2010.01) |
| *H01M 10/0568* | (2010.01) |

(52) U.S. Cl.
CPC ............ *H01M 4/38* (2013.01); *C01G 39/00* (2013.01); *C01G 39/02* (2013.01); *H01M 4/13* (2013.01); *H01M 4/381* (2013.01); *H01M 4/48* (2013.01); *H01M 4/582* (2013.01); *H01M 4/623* (2013.01); *H01M 10/054* (2013.01); *C01P 2002/08* (2013.01); *C01P 2002/50* (2013.01); *C01P 2002/54* (2013.01); *C01P 2002/72* (2013.01); *C01P 2004/03* (2013.01); *H01M 10/0568* (2013.01); *H01M 10/0569* (2013.01)

(58) Field of Classification Search
CPC ............... H01M 4/38; H01M 4/381; H01M 2300/0028; H01M 4/48; H01M 4/582; H01M 10/054; H01M 10/0568; H01M 10/0569; H01M 2220/30
See application file for complete search history.

(56) References Cited

U.S. PATENT DOCUMENTS

| | | | |
|---|---|---|---|
| 4,302,518 A | 11/1981 | Goodenough et al. | |
| 5,980,855 A * | 11/1999 | Shackle ............... | B01J 31/0208 423/179.5 |
| 8,062,791 B1 | 11/2011 | Poeppelmeier et al. | |
| 8,722,242 B2 | 5/2014 | Muldoon et al. | |
| 2008/0199772 A1* | 8/2008 | Amatucci ............ | H01M 4/364 429/188 |
| 2010/0151331 A1* | 6/2010 | Sun ...................... | H01M 4/1391 429/231.95 |
| 2013/0260225 A1* | 10/2013 | Doe ...................... | H01M 4/381 429/188 |
| 2014/0106214 A1 | 4/2014 | Doe et al. | |

FOREIGN PATENT DOCUMENTS

| | | | | |
|---|---|---|---|---|
| WO | WO-2008/144271 | | 11/2008 | |
| WO | WO 2010039732 A2 * | | 4/2010 | ............ H01M 4/505 |

OTHER PUBLICATIONS

Bohnke, C., et al. "Electrochemical intercalation of lithium into the perovskite-type NbO 2 F: influence of the NbO 2 F particle size." Journal of Solid State Electrochemistry 5.1 (2001): 1-7.*
Antipov et al., "Perspectives on Li and transition metal fluoride phosphates as cathode materials for a new generation of Li-ion batteries", IUCrJ, Jan. 2015, vol. 2, Pt. 1, pp. 85-94.
Aurbach et al., "Prototype systems for rechargeable magnesium batteries", Nature, 2000, vol. 407, pp. 724-727.
Gershinsky et al., "Electrochemical and Spectroscopic Analysis of Mg2+ Intercalation into Thin Film Electrodes of Layered Oxides: V2O5 and MoO3", Langmuir, 2013, vol. 29, pp. 10964-10972.
Pierce et al., "Preparation and Properties of Molybdenum Fluoro-Bronzes", J. of Solid State Chem., 1970, vol. 1, pp. 332-338.
Sleight, A. W., "Tungsten and Molybdenum Oxyfluorides of the Type MO3-xFx", J. Inorg. Chem., 1969, vol. 8, pp. 1764-1767.

* cited by examiner

*Primary Examiner* — Sarah A. Slifka
(74) *Attorney, Agent, or Firm* — Foley & Lardner LLP (57) ABSTRACT

An electrochemical cell includes a cathode including an early transition metal fluoro-bronze; an anode including magnesium metal; and an electrolyte; wherein: the early transition metal fluoro-bronze is configured for intercalation of magnesium ions.

9 Claims, 6 Drawing Sheets

FIG. 6B though non-limiting, examples of materials and reaction conditions are disclosed herein.

MAGNESIUM ELECTROCHEMICAL CELLS

GOVERNMENT RIGHTS STATEMENT

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to cathodic materials for use in magnesium ion batteries. In particular, the technology is related to transition metal fluoro-bronzes as cathode materials in magnesium batteries.

BACKGROUND

With modern portable devices playing an increasingly larger role in the everyday lives of people and electric vehicles, and becoming more commercially viable with every year, advances in battery technology can create immediate changes in our world. While lithium ion batteries have been the premiere technology in these and other secondary battery applications, they have limitations. Lithium-ion batteries use of anodes that include carbon, which can limit lithium-ion energy density. Metallic lithium anodes are limiting in terms of safety and cyclability owing to dendrite formation on the surface of lithium. Dendrite formation may eventually lead to short-circuiting of the cell, and, in some cases, cell failure cause.

SUMMARY

In one aspect, an electrochemical cell is provided, the cell including a cathode including an early transition metal fluoro-bronze; an anode including magnesium; and an electrolyte; wherein the early transition metal fluoro-bronze is configured for intercalation of magnesium ions. In some embodiments, the transition metal of the early transition metal fluoro-bronze is Ti, V, Nb, Ta, Mo, W, Re, or a mixture of any two or more thereof. In some embodiments, the early transition metal fluoro-bronze is a metal oxyfluoride having a $VOF_3$-type structure, a $ReO_3$-type structure, a $SnF_4$-type structure, or a $MoO_2F_2$-type structure. In any of the above embodiments, the early transition metal fluoro-bronze is a compound of formula $M_xO_nF_q$, wherein M is Cr, Mn, Mo, Nb, Re, Ta, Tc, Ti, V, or W; x is greater than 0 and less than 5; n is an integer from 1 to 10, and q is greater than 0 to about 20% of n. In some embodiments, M is Ti, V, Nb, Ta, Mo, W, Re, or a mixture of any two or more thereof. In some embodiments, the early transition metal fluoro-bronze may include $CrO_2F_2$, $CrOF_3$, $MnO_3F$, $MoOF_4$, $MoO_2F_2$, $NbOF_3$, $NbO_2F$, $Nb_3O_5F_5$, $Nb_3O_7F$, $ReOF_4$, $ReO_2F_3$, $ReO_3F$, $TaOF_3$, $TaO_2F$, $TcOF_4$, $TcO_2F_3$, $Ta_3O_7F$, $TcO_3F$, $TiOF_2$, $VOF_3$, or $WOF_4$. In any of the above embodiments, the early transition metal fluoro-bronze may include $MoO_{2.8}F_{0.2}$.

In any of the above embodiments, the electrolyte may include an aprotic solvent and a salt. In some embodiments, the aprotic solvent may include tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, higlyme, or propylene carbonate. In some embodiments, the salt is a magnesium salt.

In another aspect, an electrochemical cell is provided, the cell including an early transition metal fluoro-bronze as a cathode active material, wherein the early transition metal fluoro-bronze is capable of intercalating magnesium ions.

In another aspect, a cathode active material is provided which includes an early transition metal fluoro-bronze configured to be disposed within a magnesium-based electrochemical cell.

In another aspect, a process of preparing an early transition metal fluoro-bronze is provided, the process including contacting an early transition metal oxide and an early transition metal in a reaction vessel to form a mixture; heating the mixture at a temperature sufficient to form the fluoro-bronze. In such aspects, the contacting may include intimately mixing the early transition metal oxide and the early transition metal. In any such embodiments, the early transition metal fluoro-bronze may be $MoO_{2.8}F_{0.2}$.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

It has now been found that early transition metal oxide-fluoride compounds, called fluoro-bronzes, may be used as cathode host materials for magnesium batteries. Such batteries include an early transition metal fluoro-bronze as a cathode host material and an anode that includes magnesium metal as an anode active material. Magnesium does not form dendrites, is not pyrophoric, is more abundant than lithium, has a reduction potential of −2.372 V versus the standard hydrogen electrode (SHE), and has a higher volumetric capacity than lithium. Accordingly, the use of magnesium in batteries has the potential to be superior to the current lithium technologies. It has been found that the family of oxide fluoro-bronze cathodes based on early transition metal oxides, such as, but not limited to, $V_2O_5$, $Nb_2O_5$, $MoO_3$, and $WO_3$, when substituted with alkali metals, hydrogen, fluoride, or a mixture of any two or more thereof, provide for good rate capability and utilizable capacity.

As used herein, the term "fluoro-bronze," generally refers to early transition metal oxyfluorides. Not all early transition metal oxyfluorides are fluoro-bronzes. Fluoro-bronzes are generally conducting or semiconducting materials, while non-fluoro-bronze materials are non-conducting. In fluoro-bronzes, at least a portion of the transition metals in the material are slightly reduced when compared to the normal oxyfluoride. In other words, a principal characteristic of bronzes is their range of composition, which results in the transition metal exhibiting a variable formal valence. Without being bound by theory, it is believed that the slight reduction in oxidation of the early transition metal produces the conducting or semi-conducting character of the fluoro-bronze.

In one aspect, an electrochemical cell is provided, the cell including a cathode that includes a transition metal fluoro-bronze, an anode comprising magnesium, an alloy, insertion oxide or sulfide, or a carbon capacitor, and an electrolyte. The transition metal may be an early transition metal, such as, Ti, V, Nb, Ta, Mo, W, or Re. In addition, the early transition metal compound may, in some embodiments, be a metal oxyfluoride fluoride having a $VOF_3$-type structure, a $ReO_3$-type structure, a $SnF_4$-type structure, or a $MoO_2F_2$-type structure. Such structures have a layered structure with layer spacings configured for intercalation of magnesium ions. Illustrative early transition metals for use in the early transition metal oxyfluorides include, but are not limited to, Cr, Mn, Mo, Nb, Re, Ta, Tc, Ti, V, or W.

Figure 1A:
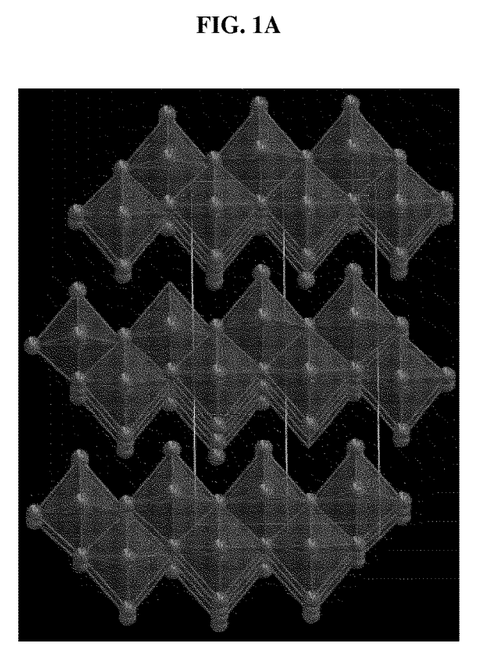
FIG. 1A is an illustration of an idealized three-dimensional structure of $MoO_{2.8}F_{0.2}$.
Figure 1B:
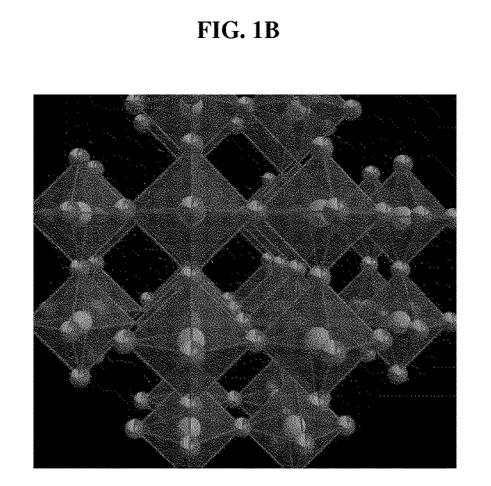
FIG. 1B is an idealized structure of $MoO_{2.6}F_{0.4}$, according to various examples.

FIG. 1A is an illustration of an idealized three-dimensional structure of $MoO_{2.8}F_{0.2}$ illustrating the spacings between layers of the material. FIG. 1B is an idealized structure of $MoO_{2.6}F_{0.4}$, which does not have a layered structure. Interestingly, $MoO_{2.8}F_{0.2}$, readily intercalates $Mg^{2+}$ while $MoO_{2.6}F_{0.4}$ does not intercalate magnesium ions. Thus, it is believed that the early transition metal fluoro-bronzes that are configured for magnesium ion intercalation may have a layered structure, and are generally applicable for use in magnesium batteries.

In any of the above embodiments, the early transition metal fluoro-bronze may be a compound of formula $M_xO_nF_q$, where M is Cr, Mn, Mo, Nb, Re, Ta, Tc, Ti, V, or W, where the early transition metal fluoro-bronze is configured to intercalate magnesium ions. Mixtures of any two or M are also included. In the structure, x is greater than 0 and less than 5; n is an integer from 1 to 10, and q is a greater than 0 to about 20% of n. In some embodiments, M is Ti, V, Nb, Ta, Mo, W, or Re, or a mixture of any two or more such metals. Illustrative oxyfluorides include, but are not limited to, $CrO_2F_2$, $CrOF_3$, $MnO_3F$, $MoOF_4$, $MoO_2F_2$, $MoO_{2.8}F_{0.2}$, $NbOF_3$, $NbO_2F$, $Nb_3O_5F_5$, $Nb_3O_7F$, $ReOF_4$, $ReO_2F_3$, $ReO_3F$, $TaOF_3$, $TaO_2F$, $TcOF_4$, $TcO_2F_3$, $Ta_3O_7F$, $TcO_3F$, $TiOF_2$, $VOF_3$, or $WOF_4$. In some embodiments, the early transition metal fluoro-bronze is $MoO_{2.8}F_{0.2}$.

The cathode may also include a current collector in communication with the early transition metal fluoro-bronze. Illustrative current collectors may be any material that is stable at the voltage of the cell and under the chemical conditions in the cell. Such materials may include, but are not limited to, stainless steel, aluminum, copper, or a carbon-based collector such as graphite.

The cathode may also include a conductive additive (such as carbon black, graphite, graphene, metal particles, or the like) to aid in electrical communication of the early transition metal fluoro-bronze with the current collector. The cathode may also include a binder to hold the fluoro-bronze together to form the cathode. Illustrative binders include, but are not limited to, poly-vinylidene fluoride (PVdF), poly (vinylidene fluoride-co-hexafluoropropene) (PVdF-HFP) or polytetrafluoroethylene (PTFE).

The electrolyte of the electrochemical cells may include an aprotic solvent and a salt. In any of the above embodiments, the aprotic solvent may include, but are not limited to, an ether or a carbonate ester. Illustrative aprotic solvents may include, but are not limited to, tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, higlyme, or propylene carbonate. Mixtures of any two or more such solvents may also be used.

Illustrative salts for use in the electrolyte include, but are not limited to, magnesium salts that are stable and soluble in the chosen solvent. For example, salts may include, but are not limited to, $Mg[B(C_2O_4)_2]_2$; $Mg[BF_2(C_2O_4)]_2$; $Mg(ClO_4)_2$, $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_3)_2)_2$; $Mg(N(SO_2CF_2CF_3)_2)_2$; $Mg(N(SO_2C_2F_5)_2)_2$; $Mg(BF_3C_2F_5)_2$; and $Mg(PF_3(CF_2CF_3)_3)_2$. In some embodiments, the magnesium metal salt is a mixture of any two or more such magnesium metal salts. In some embodiments, the salt includes $Mg(N(SO_2CF_3)_2)_2$.

The anode may also include a current collector in communication with the magnesium. Illustrative current collectors may be any material that is stable at the voltage of the cell and under the chemical conditions in the cell. Such materials may include, but are not limited to, stainless steel, aluminum, copper, or a carbon-based collector such as graphite.

The anode may also include a binder to aid in electrical communication of the magnesium with the current collector and to form the anode. Illustrative binders include, but are not limited to, poly-vinylidene fluoride (PVdF), poly(vinylidene fluoride-co-hexafluoropropene) (PVdF-HFP) or polytetrafluoroethylene (PTFE).

In another aspect, a cathode active material is provided, the active material including a transition metal fluoro-bronze configured to be disposed within a magnesium-based electrochemical cell, where the metal fluoro-bronze is configured to intercalate magnesium ions. The transition metal may be one of the early transition metals Ti, V, Nb, Ta, Mo, W, Re. In addition the early transition metal compound may, in some embodiments, be a metal oxyfluoride having a $VOF_3$-type structure, a $ReO_3$-type structure, a $SnF_4$-type structure, or a $MoO_2F_2$-type structure. Such structures have a layered structure with layer spacings configured for intercalation of magnesium ions. Illustrative early transition metals for use in the early transition metal oxyfluorides include, but are not limited to, Cr, Mn, Mo, Nb, Re, Ta, Tc, Ti, V, or W.

In any of the above embodiments, the early transition metal oxyfluoride or fluoro-bronze may be a compound of formula $M_xO_nF_q$, where M is Cr, Mn, Mo, Nb, Re, Ta, Tc, Ti, V, or W, where the early transition metal fluoro-bronze or oxyfluoride is configured to intercalate magnesium ions. Mixtures of any two or M are also included. In the structure, x is greater than 0 and less than 5; n is an integer from 1 to 10, and q is greater than 0 to about 20% of n. In some embodiments of the fluoro-bronzes, M is Ti, V, Nb, Ta, Mo, W, Re, or a mixture of any two or more such metals. Illustrative early transition metal oxyfluorides include, but are not limited to, $CrO_2F_2$, $CrOF_3$, $MnO_3F$, $MoOF_4$, $MoO_2F_2$, $MoO_{2.8}F_{0.2}$, $NbOF_3$, $NbO_2F$, $Nb_3O_5F_5$, $Nb_3O_7F$, $ReOF_4$, $ReO_2F_3$, $ReO_3F$, $TaOF_3$, $TaO_2F$, $TcOF_4$, $TcO_2F_3$, $Ta_3O_7F$, $TcO_3F$, $TiOF_2$, $VOF_3$, or $WOF_4$. In some embodiments, the early transition metal fluoro-bronze is $MoO_{2.8}F_{0.2}$.

Also provided are processes for preparing the fluoro-bronzes for use as cathodes in magnesium batteries. Generally, a metal oxide and the metal are combined in an appropriate stoichiometric ratio in a reactor and exposed to an aqueous solution of HF. The reactor and contents are then heated to a temperature sufficient to form the fluoro-bronze. The temperature may be from about 100° C. to about 500° C. In some embodiments, the temperature range is from about 200° C. to about 300° C. In some embodiments, the temperature range is from about 220° C. to about 250° C. The heating may be maintained for a time period that is sufficient to form the fluoro-bronze as well and may range for 1 to 50 hours, or more. In some embodiments, the time period is from about 15 hours to about 40 hours, while in other embodiments, the time period is about 24 hours. After the time period has elapsed, the reactor temperature may be gradually decreased, or metered, until room temperature is reached. The gradual decrease may be at a rate of from 1° C./hour to about 25° C./hour. In some embodiments, the rate is from about 5° C./hour to about 10° C./hour.

In any embodiments of the process, the metal oxide may be used at a slight excess, on a molar basis, with the amount of the metal controlling the final stoichiometry of the fluoro-bronze. Modification of the ratio of cubic and layered phases may be accomplished by increasing or decreasing the amount of HF, respectively.

In any embodiments of the process, the contacting may include intimately mixing the metal oxide and the metal. This may be accomplished by a variety of methods including, but not limited to, griding, ball milling, or other physical stirring and mixing methods.

The vessel that the process is conducted in will be inert toward the reactants and products it is intended to contain. For example, the vessel should be inert toward the HF or metal oxides. Illustrative vessel materials, or at least vessel lining materials include, but are not limited to poly(tetrafluoroethylene) (PTFE), gold and platinum or other nobel metals.

As an illustration of the process, formation of the fluoro-bronze $MoO_{2.8}F_{0.2}$ may be conducted by contacting $MoO_3$ and Mo in the presence of aqueous HF to form a mixture. The mixture is then heated to about 240° C. for 24 hours, followed by a temperature decrease at a rate of 6° C./hour to form the $MoO_{2.8}F_{0.2}$. Under such conditions, formation of the cubic phase, $MoO_{2.4}F_{0.6}$, is minimized.

The present invention, thus generally described, will be understood more readily by reference to the following examples, which are provided by way of illustration and are not intended to be limiting of the present invention.

EXAMPLES

Synthesis of $MoO_{2.8}F_{0.2}$. In a representative synthesis, $MoO_3$ powder (4.8 g, 33 mmol, Aldrich) was combined with Mo powder (120 mg, 1.25 mmol, Aldrich). The dry reagents were mixed thoroughly and combined with DI water (44 mL) and 48% $HF_{(aq)}$ (6 mL, 167 mmol, Aldrich) in a TEFLON® liner in a 125 mL autoclave. The autoclave was heated at 240° C. for 24 hours, after which time the temperature was reduced to room temperature at a rate of 6° C. per hour. The contents of the autoclave were vacuum filtered, washed with DI water, and allowed to dry in air. $MoO_{2.8}F_{0.2}$ (1.7 g) was recovered as a dark blue powder. The overall reaction is shown in Scheme 1.

Figure 3:
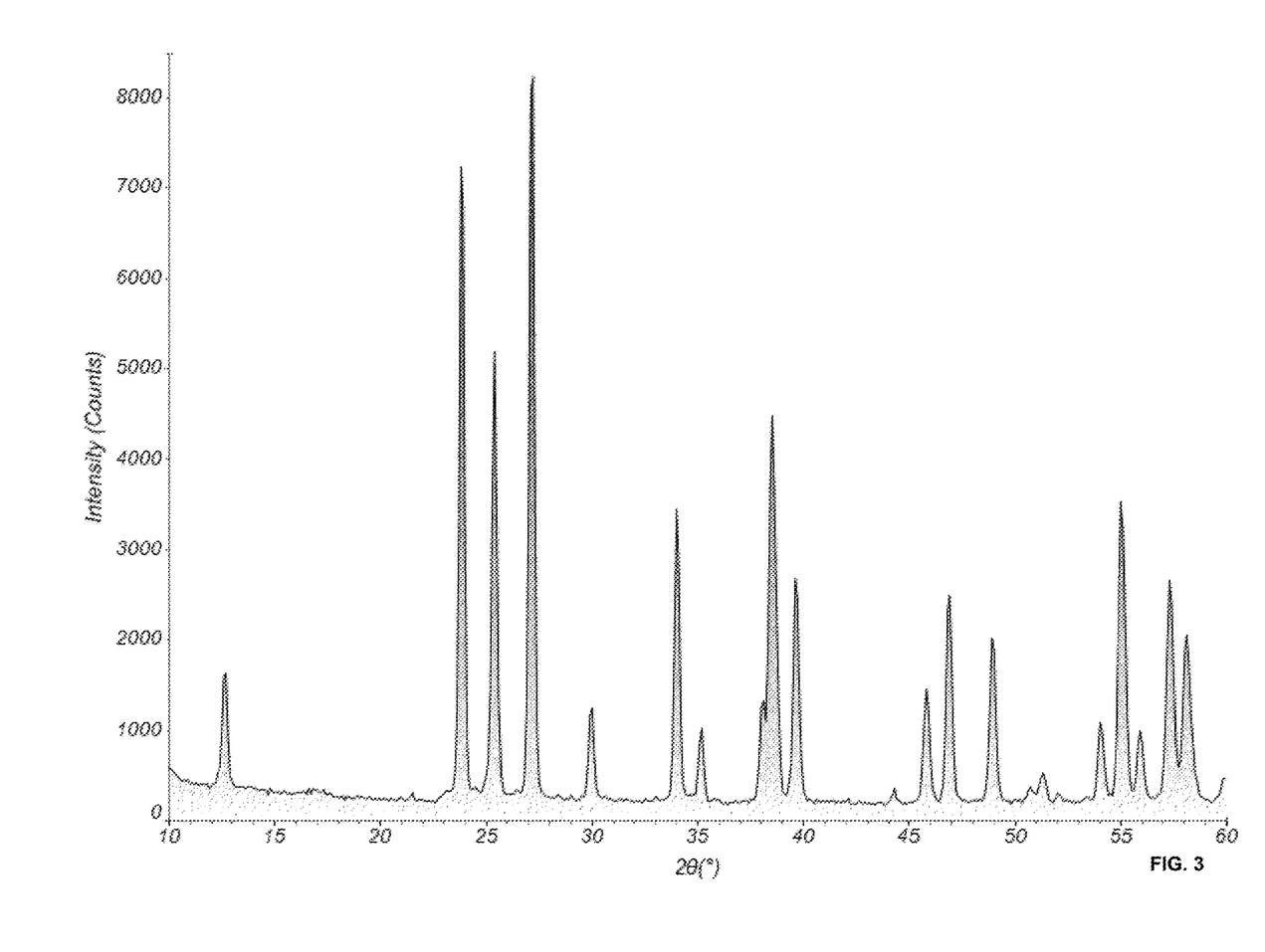
FIG. 3 is a PXRD diffractogram of $MoO_{2.8}F_{0.2}$, according to the examples.

Scheme 1:

Powder X-Ray Diffraction: Phase purity was determined by powder X-ray diffraction (PXRD) using a Rigaku Ultima diffractometer. All products were phase pure. FIG. 3 is a PXRD of the $MoO_{2.8}F_{0.2}$.

Charge and Discharge Studies: Cathodes were prepared from the $MoO_{2.8}F_{0.2}$ by grinding the material in a ball mill, and preparing a slurry of the active material, acetylene black, and poly(vinylidene difluoride) (80:10:10) in N-methylpyrrolidone (NMP). The resultant slurry was then cast as a 200 micron thick film on a stainless steel foil as a current collector. The NMP was then removed by drying in an oven at 70° C. for 4 hours. Individual cathodes (0.97 $cm^2$) were punched from the foil. Control cathodes were similarly prepared using $MoO_3$.

Size 2032 coin cells were assembled from the punched foil cathodes, with an electrolyte of 100 μL of 0.2M $Mg(TFSI)_2$ (magnesium trimethylsulfonimide) in propylene carbonate. A high surface area supercapacitor composed of BP-2000 carbon black cast on stainless steel as a counter-electrode. Coin cells were cycled on a Maccor battery cycler at a current of 5 μA from −1 V to 1.5 V.

Figure 2:
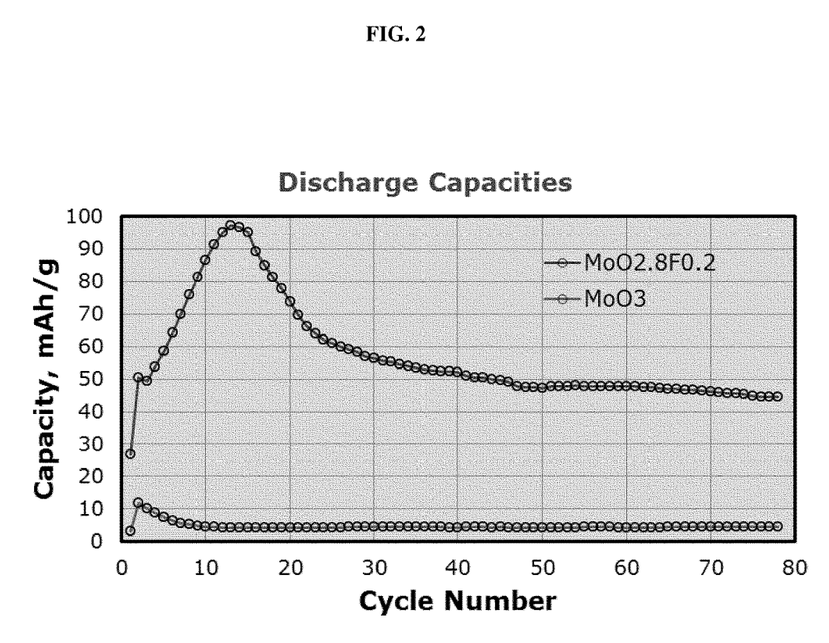
FIG. 2 is a graph showing specific capacity of $MoO_{2.8}F_{0.2}$ and $MoO_3$, according to the examples.
Figure 4:
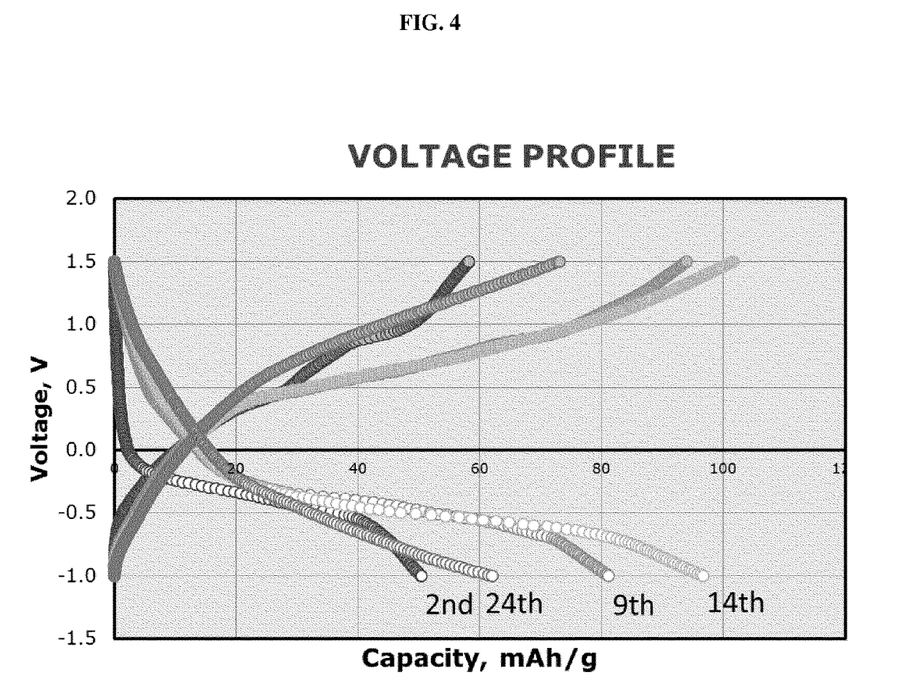
FIG. 4 is graph of the voltage profiles for various cycles of the cell, according to the examples.

Galvanostatic charge/discharge cycling illustrates that $MoO_{2.8}F_{0.2}$, when cells compared to their parent oxide, $MoO_3$, show higher utilizable capacity, as well as better capacity retention with cells still functioning after 75 cycles. See FIG. 2. $MoO_{2.8}F_{0.2}$ cells also show a unique capacity break-in and fade phenomenon over the first 20 cycles. This is also apparent in the charge/discharge curves where early cycles have distinct plateaus missing from later cycles, which show only a downward curve. FIG. 4 illustrates various charge and discharge profiles. Early cycles show distinct, downward slopping plateaus while later cycles show a constant voltage fade behavior.

Results. Post-cycling PXRD diffractograms of the $MoO_{2.8}F_{0.2}$ were indexed on the basis of an orthorhombic cell of space group Cbnn (63) with a=3.877, b=14.043, c=3.724 Å. Scanning electron microscopy shows $MoO_{2.8}F_{0.2}$ crystals form plates of tens of microns across.

Figure 5:
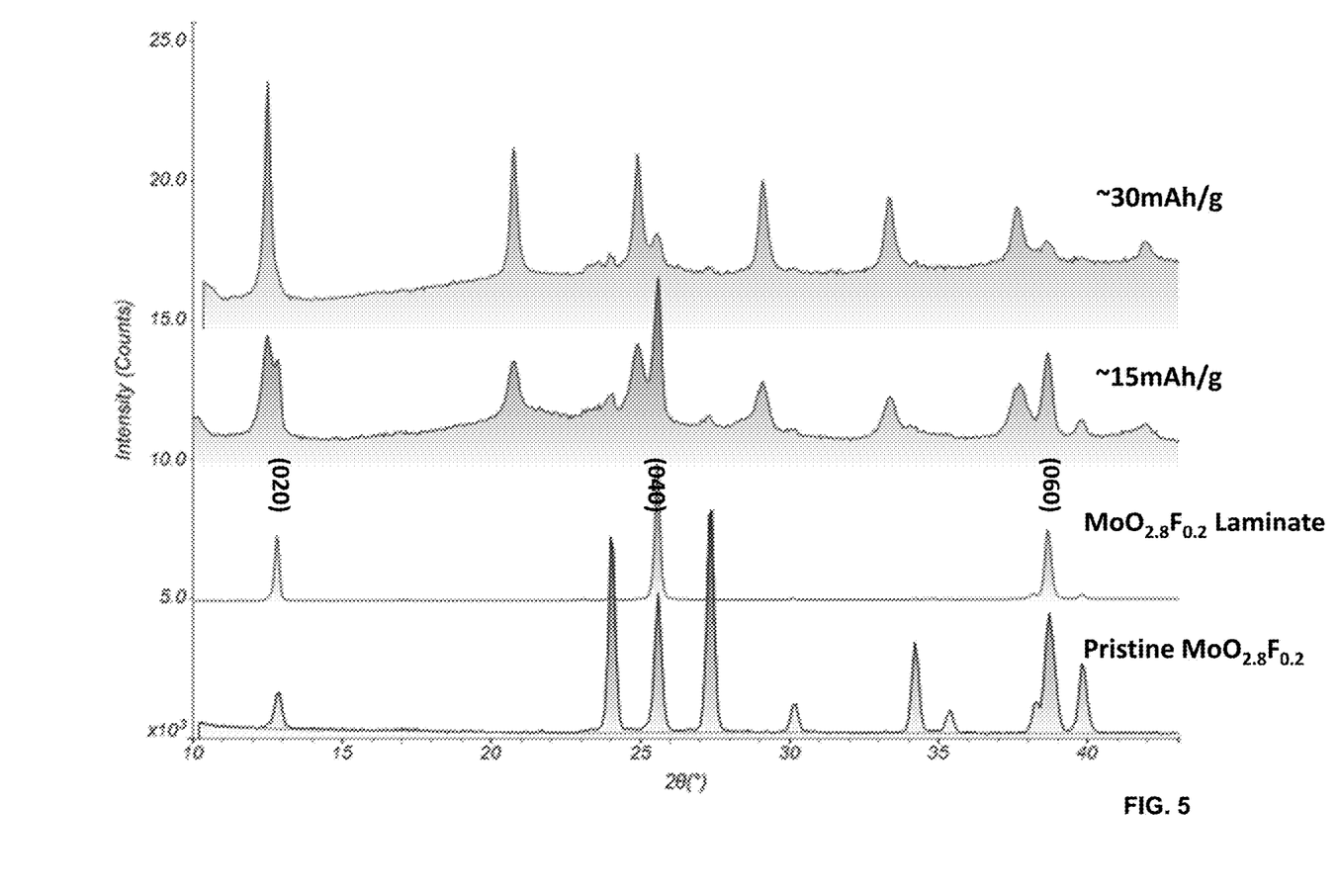
FIG. 5 is a PXRD graph for various stages of cycling of the cells, according to the examples.

PXRD was done on laminated cathodes before and after cycling Laminates of uncycled $MoO_{2.8}F_{0.2}$ show preferred orientation with only (OkO) peaks appearing with any significant intensity. However, the structure of $MoO_{2.8}F_{0.2}$ changes dramatically after cycling. The diffractogram of cycled $MoO_{2.8}F_{0.2}$ shows evenly spaced peaks attributed to the formation of a new turbostatically disordered layered phase with residual (OkO) peaks from $MoO_{2.8}F_{0.2}$. FIG. 5 illustrates a comparison of pristine $MoO_{2.8}F_{0.2}$ (bottom trace), a sample of the $MoO_{2.8}F_{0.2}$ as a laminate (second from bottom trace), after about 15 mAh/g of cycling (second from top trace), and after about 30 mAh/g cycling (top trace). Generally, FIG. 5 illustrates the pristine layered fluoro-bronze, the preferred orientation of a laminate made from the layered fluoro-bronze, that the ratio of peak intensities correlates with capacity, and that the interlayer distance of the material is expanding during discharge.

Figure 6A:
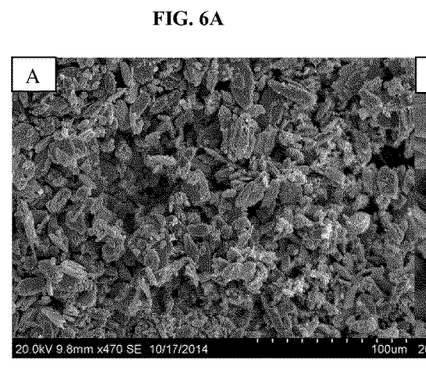
FIGS. 6A and 6B are SEM images of the layered fluoro-bronze at two difference magnifications, according to the examples.
Figure 6B:
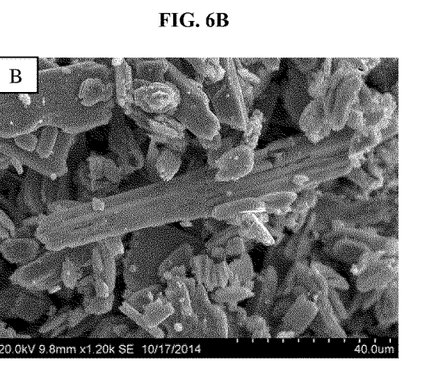

FIG. 6 is an SEM image of the layered fluoro-bronze at two different magnifications. This demonstrates the large particle size of the product and explains why grinding is necessary.

Discussion. When synthesizing $MoO_{2.8}F_{0.2}$, phase purity may be monitored. The cathode materials tolerate a modest excess of $MoO_3$, which will remain in solution upon cooling. Excess Mo will introduce a more reduced cubic phase into the product mixture. Extensive mixing of the solid reagents, aids in producing a phase-pure product.

The synthetic method described is distinct from known synthetic methods of producing fluoro-bronzes. The synthetic method provides for phase-pure $MoO_{2.8}F_{0.2}$ at low temperatures using inexpensive TEFLON® (polytetrafluoroethylene) reaction vessels to provide chemical inertness. In comparison, a higher fluorinated orthorhombic phase, $Mo_4O_{11}F$, was made hydrothermally at 700° C. in a gold ampule (see Sleight *J. Inorg. Chem* 1969, 8, 1764-1767), and orthorhombic $Mo_4O_{11.2}F_{0.8}$ was prepared in gold ampules at 500° C. (see Pierce et al. *J. Solid State Chem.* 1970, 1, 332-338).

When assembled into cells, $MoO_{2.8}F_{0.2}$ shows both a higher utilizable capacity and slower capacity fade than $MoO_3$. This difference is believed to be attributable to the electrically semiconducting nature of the active material. While the use of $MoO_{2.8}F_{0.2}$ as a cathode active material is illustrated herein, other early transition metal fluoro-bronzes may be used.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
    a cathode comprising at least 80 wt % of an early transition metal fluoro-bronze comprising $MoO_{2.8}F_{0.2}$ and having a layered structure;
    an anode comprising magnesium; and
    an electrolyte;
    wherein:
        the early transition metal fluoro-bronze is configured for intercalation of magnesium ions.

2. The electrochemical cell of claim 1, wherein the cathode further comprises a current collector.

3. The electrochemical cell of claim 1, wherein the cathode further comprises a binder.

4. The electrochemical cell of claim 1, wherein the binder comprises poly-vinylidene fluoride (PVdF), poly(vinylidene fluoride-co-hexafluoropropene) (PVdF-HFP) or polytetrafluoroethylene (PTFE).

5. The electrochemical cell of claim 1, wherein the anode further comprises a current collector.

6. The electrochemical cell of claim 1, wherein the electrolyte comprises an aprotic solvent and a salt.

7. The electrochemical cell of claim 6, wherein the aprotic solvent comprises tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, higlyme, or propylene carbonate.

8. The electrochemical cell of claim 6, wherein the salt is a magnesium salt.

9. The electrochemical cell of claim 8, wherein the magnesium salt is $Mg[B(C_2O_4)_2]_2$; $Mg[BF_2(C_2O_4)]_2$; $Mg(ClO_4)_2$, $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_3)_2)_2$; $Mg(N(SO_2CF_2CF_3)_2)_2$; $Mg(N(SO_2C_2F_5)_2)_2$; $Mg(BF_3C_2F_5)_2$; or $Mg(PF_3(CF_2CF_3)_3)_2$.

* * * * *